United States Patent
Li et al.

(10) Patent No.: US 7,006,849 B2
(45) Date of Patent: Feb. 28, 2006

(54) SPATIAL DOMAIN MATCHED FILTERING METHOD AND ARRAY RECEIVER IN WIRELESS COMMUNICATION SYSTEM

(75) Inventors: Jiang Li, Shen Zhen (CN); Jinlin Zhang, Shen Zhen (CN); Qi Ding, Shen Zhen (CN); Hebing Wu, Shen Zhen (CN); Junfeng Guo, Shen Zhen (CN)

(73) Assignee: Huawei Technologies Co., Ltd., Shen Zhen (CN)

( * ) Notice: Subject to any disclaimer, the term of this patent is extended or adjusted under 35 U.S.C. 154(b) by 412 days.

(21) Appl. No.: 10/439,219

(22) Filed: May 15, 2003

(65) Prior Publication Data

US 2003/0236108 A1 Dec. 25, 2003

Related U.S. Application Data

(63) Continuation of application No. PCT/CN01/00693, filed on May 8, 2001.

(30) Foreign Application Priority Data

Nov. 15, 2000 (CN) .............................. 00133919 A

(51) Int. Cl.
*H04B 1/38* (2006.01)
(52) U.S. Cl. ................. 455/562.1; 455/307; 375/349
(58) Field of Classification Search ........ 455/561, 455/562.1, 575.5, 307, 334, 339; 375/148, 375/346, 347, 348, 349, 350; 342/17, 196, 342/378, 379
See application file for complete search history.

(56) References Cited

U.S. PATENT DOCUMENTS

| | | | | |
|---|---|---|---|---|
| 5,379,046 A | * | 1/1995 | Tsujimoto | 342/378 |
| 5,990,831 A | | 11/1999 | McDowell | |
| 6,188,718 B1 | * | 2/2001 | Gitlin et al. | 375/349 |

FOREIGN PATENT DOCUMENTS

| | | |
|---|---|---|
| CN | 1261223 | 7/2000 |
| RU | 2177207 | 12/2001 |
| WO | WO 99/65160 A | * 12/1999 |

* cited by examiner

*Primary Examiner*—Quochien B. Vuong
(74) *Attorney, Agent, or Firm*—Dorsey & Whitney LLP

(57) ABSTRACT

A spatial domain matched filtering method and an array receiver in a radio communication system are provided. The spatial domain matched filtering method includes the steps of receiving array digital signals; weighting the array digital signals to obtain digital beam output signals; evaluating power value of digital beam output signals and normalizing the digital beam output signals; evaluating a correlation coefficient reflecting the energy of an expected signal in each beam; wherein evaluating equations are:

$$Coeff_i(k) = \frac{1}{N}\sum_{n=1}^{N} \|\tilde{S}_{Bi}(n)s^*(n)\|^2,$$

$Coeff_i(k) = Coeff_i(k) + \alpha Coeff_i(k-1)$;
and outputting the digital beam output signal corresponding to the maximum correlation coefficient.

4 Claims, 5 Drawing Sheets

SPATIAL DOMAIN MATCHED FILTERING METHOD AND ARRAY RECEIVER IN WIRELESS COMMUNICATION SYSTEM

CROSS-REFERENCE TO RELATED APPLICATION

This utility patent application is a continuation application and claims priority of the PCT International Patent Application, serial number PCT/CN01/00693, filed on May 8, 2001, which claims the priority of the Chinese patent application, serial number CN 00133919.2, filed on Nov. 15, 2000; subject matter of which are incorporated herewith by reference.

FIELD OF THE INVENTION

The invention relates to an array processing method and an array receiver in a wireless communication system, and more particularly, the invention relates to a spatial domain matched filtering method and an array receiver thereof

BACKGROUND OF THE INVENTION

For a long time, wireless communication systems have been facing a conflict between the limited spectrum resources and the continuously and quickly increasing of the number of users. Although system capacity has been increased to a certain extent by technologies such as frequency division multiple access (FDMA), time division multiple access (TDMA), and code division multiple access (CDMA), these technologies are far from the demand of ever-increasing quantity of wireless traffic. Therefore, people begins to utilize the spatial domain characteristic of a data transmission channel, e.g. diversity, sectorization, and switching multi-beam and adaptive antenna array, etc., to increase the capacity of a receiving system. By using these methods, communication quality of a wireless communication system have been improved to some extent, and the capacity have been increased.

In the diversity technology, signals received by different antennas with a space larger than 10 carrier-wavelength are not correlated. The signals received by respective antennas are combined by using a maximum ratio to improve system performance such as multipath anti-fading.

In the sectorization technology, a cell is divided into 3, 6, 9, or 12 sectors, each sector being configured with an antenna and a predetermined spectrum range. The interference of the communication channels can be decreased to a certain extent by sectorization, thereby increasing communication quality of the system.

The switching multi-beam technology is to form fixed beams in a cell in different directions, wherein signal quality of an expected signal in each beam is detected by a base station, and the best beam is selected to be received. One of the main reasons for calling it switching multi-beam is that during a procedure that the system selects a beam, there are controlled switches on the channels between each beam and the respective channel receiver, that is, a "switch matrix". After a certain beam is selected, a switch between the beam and the corresponding channel receiver is closed, while the switches of the other channels are open.

The signals received by respective antennas are weighted and combined adaptively by an adaptive antenna array based on maximum signal to noise ratio criterion, maximum likelihood criterion, and minimum mean square error criterion, etc. The interference and noise signals are suppressed effectively, thereby increasing the entire performance of the wireless system.

Because the diversity method requires a large distance between the antennas (normally, larger than 10 wavelengths), the more the antennas, the more the spaces are occupied. However, spaces used practically by a base station are limited. In addition, although the diversity method for combining by using the maximum signal to noise ratio has the effect of multipath anti-fading, it cannot suppress signal interference effectively.

The common sectorization methods have used 3 sectors or 6 sectors. The reason for not using more sectors is that the more the division of the sectors, the less the spectrum resources can be used by each sector, and signal relay efficiency will be decreased. Furthermore, the more the division of the sectors, the more the beams overlap between different sectors, interference between the channels will increase, and system performance will decrease.

It can be considered to some extent that switching multi-beam is a type of sectorization method, whereby the division of sectors is formed dynamically by a combination of different beams. Because "the best" beam is set for receiving signals, switching multi-beam differs from the sectorization method. The more the beams of the switching multi-beam overlap, the more gain loss at the boundary between the beams will be decreased. The field of a beam of a current switching multi-beam system is cohered and overlapped by a directional antenna or by using a radio frequency phase shift network (for example, Butler matrix) to form a plurality of narrow beams directing to different directions in the space for covering a cell. In theory, the narrower the beams are, the better the performance of spatial domain filtering a multi-beam antenna switched by beams will have, and the stronger the ability for suppressing the signal interference. However, because an aperture of a directional antenna is limited, and phase shift accuracy of a radio frequency phase shift network is limited, the width of a beam is limited, and the overlapping the beams is limited. As a result, the ability for improving communication capacity of the existing switching multi-beam systems is limited. Furthermore, since a switching matrix of the existing switching multi-beam systems is implemented by radio frequency switching devices, it makes the cost of system hardware increase. When beams are selected by switching beams, it is implemented normally based on power magnitude of an expected signal in a beam. When there is strong interference, and the time for evaluating expected power of a user is rather short, it will sometimes cause malfunction in selecting the beams.

An adaptive antenna array employs an adaptive algorithm based on different standards to obtain an array-weighting factor. Although optimum system performance can be achieved in some extent, a large amount of calculation will be required for the adaptive algorithm with excellent performance. The requirement for digital signal processing devices is rather high, and a number of algorithms cannot be implemented by using high speed processing chips that are currently used.

Based on the above reasons, and by incorporating the technology of switching multi-beam and adaptive antenna array, one of the objectives of the invention is to provide a digital baseband spatial domain matched filtering method for an array receiver in a radio communication system. The method allows simple and small amount of calculation. Therefore, the cost for implementing the hardware is low, while the system performance is better.

SUMMARY OF THE INVENTION

Based on the above objective of the invention, a digital baseband spatial domain matched filtering method provided by the invention comprises the steps of:

(a) receiving array digital signals;

(b) performing a weighting calculation for the array digital signals and weighting vectors of $N_B$ set to obtain a digital beam output signal $S_{B_i}(n)$ of $N_B$ set;

(c) evaluating the power value $P_{S_{Bi}}(n)$ of a digital beam output signal within a correlation time period:

$$P_{S_{Bi}}(n) = \alpha_P S_{B_i}(n) S_{B_i}^*(n) + (1-\alpha_P) S_{B_i}(n-1) S_{B_i}^*(n-1)$$

and normalizing the digital beam output signal $S_{Bi(n)}$ to obtain a power normalized digital beam output signal $$\tilde{S}_{Bi}(n) = \frac{S_{Bi}(n)}{P_{S_{Bi}}(n)};$$

wherein, the prefix "*" indicates a complex conjugation calculation, $\alpha_P$ is a constant, $0 < \alpha_P < 1$;

(d) correlating the power normalized digital beam output signal $\tilde{S}_{B_i}(n)$ with a reference signal and evaluating a correlation coefficient $Coeff_i$ reflecting energy of an expected signal in each beam; the equation for evaluating is:

$$Coeff_i(k) = \frac{1}{N} \sum_{n=1}^{N} \| \tilde{S}_{Bi}(n) s^*(n) \|^2$$

$Coeff_i(k) = Coeff_i(k) + \alpha Coeff_i(k-1)$ wherein, the prefix "*" indicates a complex conjugation calculation, s(n) is the reference signal; N is a total amount of sample points, a product of N with a sample time is smaller than coherent time; $Coeff_i(k)$ indicates the correlation coefficient reflecting the energy of the expected signal in an ith beam, obtained by accumulating a kth correlation parameter, and $\alpha$ is a constant, $0.5 < \alpha < 1$;

(e) comparing the correlation coefficients $Coeff_i(k)$ reflecting the energy of the expected signal in respective beams to obtain a maximum correlation coefficient $Coeff_{max}$, and the digital beam output signal $S_{B_i}(n)$ corresponding to the maximum correlation coefficient $Coeff_{max}$ being outputted.

Based on another objective of the invention, an array receiver is provided by the invention, which comprises:

an antenna array composing of a plurality of antennas;

an array digital signal generation module connecting with the antenna array for transforming analog signals received by the antenna array into digital signals;

a digital baseband spatial domain matched filtering module, coupled to the array digital signal generation module, for forming at least one signal beam on each channel for the digital signal of the array digital signal generation module;

a digital receiver module, coupled to the digital baseband spatial domain matched filtering module, for receiving at least one signal beam formed on each channel by the digital baseband spatial domain matched filtering module, and combining the signal beam over a time domain; and wherein the digital baseband spatial domain matched filtering module comprises:

a digital baseband spatial domain matched filter set for receiving the digital signal, weighting the digital signal with weighted vectors of $N_B$ set, and outputting a digital beam output signal $S_{B_i}(n)$ of $N_B$ set;

a multiplexer for forming the digital beam output signals $S_{B_i}(n)$ of the $N_B$ set outputted by the digital baseband spatial domain matched filter set into the digital beams corresponding to a plurality of channels;

a multi-beam selection module for receiving the digital beam outputted by the multiplexer, normalizing the digital beam output signal $S_{B_i}(n)$, and evaluating power value $P_{S_{Bi}}(n)$ of the digital beam output signal within a correlation time period:

$$P_{S_{Bi}}(n) = \alpha_P S_{B_i}(n) S_{B_i}^*(n) + (1+\alpha_P) S_{B_i}(n-1) S_{B_i}^*(n-1)$$

and normalizing the digital beam output signal $S_{B_i}(n)$ to obtain power normalized digital beam output signal $$\tilde{S}_{Bi}(n) = \frac{S_{Bi}(n)}{P_{S_{Bi}}(n)};$$

wherein, the prefix "*" indicates a complex conjugation calculation, $\alpha_P$ is a constant, $0 < \alpha_P < 1$; then, correlating the power normalized digital beam output signal $\tilde{S}_{B_i}(n)$ with a reference signal and evaluating a correlation coefficient $Coeff_i$ reflecting energy of an expected signal in each beam and outputting a selection instruction to select the digital beam output signal $S_{B_i}(n)$ corresponding to the maximum correlation coefficient; an evaluating equation being:

$$Coeff_i(k) = \frac{1}{N} \sum_{n=1}^{N} \| \tilde{S}_{Bi}(n) s^*(n) \|^2$$

$Coeff_i(k) = Coeff_i(k) + \alpha Coeff_i(k-1)$ wherein, the prefix "*" indicates a complex conjugation calculation, s(n) is the reference signal; N is a total amount of sample points, a product of N with sample time is smaller than coherent time, $Coeff_i(k)$ indicates correlation coefficient reflecting energy of an expected signal energy in an ith beam, obtained by accumulating a kth correlation parameter, and $\alpha$ is a constant, $0.5 < \alpha < 1$;

a digital switching matrix, coupled to the multiplexer and the multi-beam selection module, respectively, for receiving the selection instruction outputted by the multi-beam selection module and outputting the digital beam output signal corresponding to the maximum correlation coefficient.

As described above, a new and simple algorithm is used in the digital baseband spatial domain matched filtering module in the invention, thereby the hardware structure can be simplified, and a better system performance can be provided.

BRIEF DESCRIPTION OF THE DRAWINGS

The embodiment of the invention will be described below in detail by incorporating the drawings.

DETAILED DESCRIPTION OF THE PREFERRED EMBODIMENTS

Figure 1:
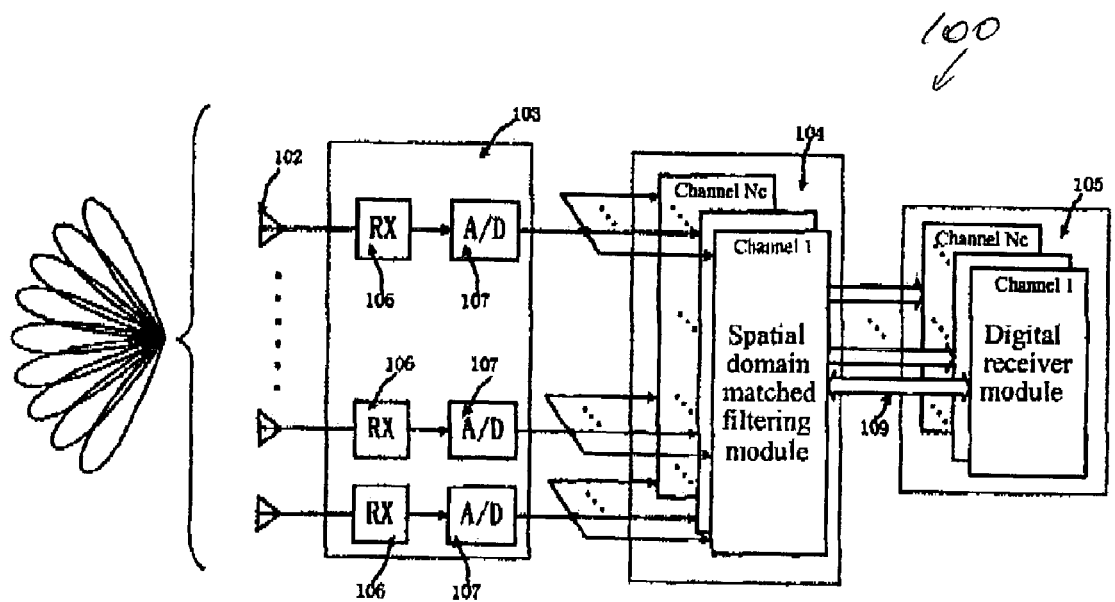
FIG. 1 is a functional block diagram showing an array receiver in accordance with the principles of the present invention.

FIG. 1 is a principle diagram of an array receiver 100 of the present invention. The array receiver 100 includes an antenna array 102, an array digital signal generation module 103, a digital baseband spatial domain matched filtering module 104, and a digital receiver module 105. The array digital signal generation module 103 converts analog signals received from the antenna array 102 into digital signals for processing digitally. The array digital signal generation module 103 comprises a receiving unit (RX) 106 and an analog to digital conversion unit (A/D) 107. At least one digital beam can be formed by the digital baseband spatial domain matched filtering module 104 for one channel. For example, for a code channel of a CDMA system, beams are formed by different multipath signals of the same code channel by the digital baseband spatial domain matched filtering module 104, the beams are sent to corresponding branches of the digital receiver module 105 (e.g. a Rake receiver may be used) after forming, and the signals are combined by the digital receiver module 105 in time domain. Because the analog signals are converted into the digital signals, the digital baseband spatial domain matched filtering module 104 can be varied flexibly based on the different system requirements.

The received signals are processed by the digital baseband spatial domain matched filtering module 104 shown in FIG. 1 by using an array process algorithm to form the beams. The quality of the signals outputted in the beams is improved, thereby the performance of the entire receiver is improved. Therefore, the array process method used by the digital baseband spatial domain matched filtering module 104 and the complexity and stability for implementing, etc., affect directly the system performance. An array receiving method, which is simple, reliable, and easy to implement, is provided by the present invention.

The digital signals outputted by the array digital signal generation module 103 in the array receiver 100 shown in FIG. 1 can be represented as:

$$x(t) = \sum_{l=1}^{L} a(\theta_l) h_l(t) s(t - \tau_l) + n(t) \quad (1)$$

wherein, $l=1,2,\ldots,L$ is the number of multipath; $a(\theta_l)$ is M*1-dimension vector, indicating an array response on M antenna elements produced by the first multipath signal relating to the direction $\theta$; $\theta_l$ is an arriving direction of wave of the first multipath; $h_l(t)$ is the fading experienced by a signal of the first multipath; $s(t)$ is a transmitted expectation signal; $\tau_l$ is a delay of the ith multipath signal; and $n(t)$ is the interference and noise signal of the array.

Figure 2:
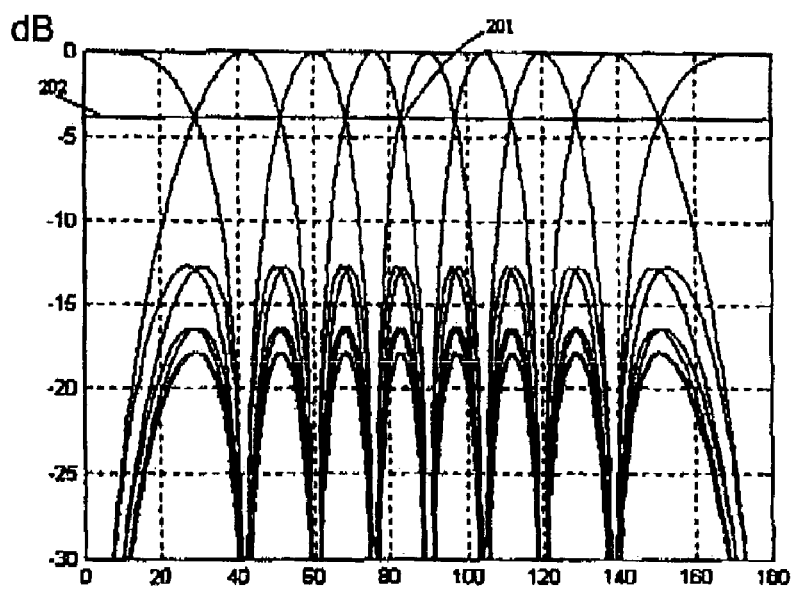
FIG. 2 is an illustration diagram showing beams covering a cell in accordance with the principles of the present invention.

Based on the types of the antenna array 102, such as a uniform straight line array, circular array, etc., it can be predetermined that the signals in the different direction have an array response $a(\theta_i)(i=1,2,\ldots,N_B)$ with the array. $W_i=a^H(\theta_i)$ (the prefix H indicates conjugation rotator arithmetic which is used as the weight of a signal received by respective antenna elements of the array, corresponding to the beams being formed by the array in direction $\theta_i$, and performing the spatial domain filtering for the received array digital signal $X(t)$. In order to consider both the result of the spatial domain filtering and the process ability of the system digital signals, the value of $N_B$ is taken to allow the difference between the gain of an intersection point 201 of the beams formed by $a^H(\theta_i)$, and the maximum gain among the entire beams is −3~0 dB, i.e., a line 202 marked in FIG. 2 is within −3~0 dB.

Figure 3:
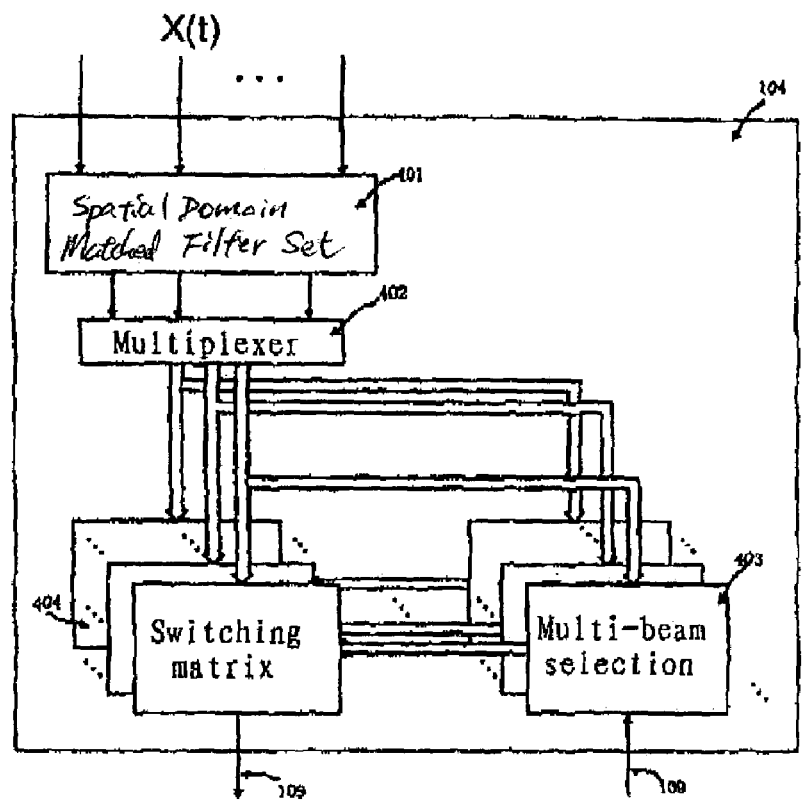
FIG. 3 is an internal functional block diagram showing a digital baseband spatial domain matched filtering module in accordance with the principles of the present invention.

An internal function diagram of the spatial domain matched filtering module 104 is shown in FIG. 3. The spatial domain matched filtering module 104 comprises a spatial domain matched filter set 401, a multiplexer 402, a multi-beam selection module 403, and a digital switching matrix 404. The spatial domain matched filter set 401 includes $N_B$ sets of weighted vectors $W_i=a^H(\theta_i)$. The spatial domain matched filter set 401 receives digital array signals $X(t)$ outputted by the array digital signal generation module 103, weights the digital array signals $X(t)$ by using the $N_B$ sets of weighted vectors $W_i$, and obtains $N_B$ digital beam output signal $S_{B_i}(t)$. The weighted result can be expressed by:

$$S_{Bi}(n)=W_i^* X(t)=a^H(\theta_i)a(\theta_d)h_d(t)S(t)+a^H(\theta_i)n(t) i=1,2,3 \ldots N_B \quad (2)$$

The $N_B$ digital beam output signals $S_{B_i}(t)$ outputted by the spatial domain matched filter set 401 are sent to the multiplexer 402 to form digital beams corresponding to a plurality of channels, $N_c$ channels, i.e. after the $N_B$ digital beams go through a set of the multiplexers 402, a total of $N_c * N_B$ beams are generated. These beams are transferred to the multi-beam selection module 403 and the digital switching matrix 404, respectively.

In the multi-beam selection module 403, in a correlation time period, power value $P_{S_{Bi}}(n)$ of the digital beam output signal is calculated:

$$P_{S_{Bi}}(n)=\alpha_P S_{B_i}(n)S_{B_i}^*(n)+(1-\alpha_P)S_{B_i}(n-1)S_{B_i}^*(n-1) \quad (3)$$

Power normalization is performed for the digital beam output signals $S_{B_i}(n)$ to obtain power normalized digital beam output signal $\tilde{S}_{B_i}(n)$:

$$\tilde{S}_{Bi}(n) = \frac{S_{Bi}(n)}{P_{S_{Bi}}(n)} \quad (4)$$

The normalization process significantly reduces the interference to beam selection correlation.

In most of the communication systems, transmitted signals often include information that have known to a receiving end in advance, such as known training sequences, pilot symbols, etc. For example, in a GSM system, 26 bits of known training sequences are included in each normal burst; in a WCDMA system, known pilot symbols are included in each slot of DPCCH. The reference signal $s(t)$ can be obtained directly or indirectly at the receiving end by using these known information. Based on the correlation of reference signal s(t) and the digital beam output signal $S_{B_i}(t)$, the correlation coefficient $Coeff_i$ reflecting energy of an expected signal in each beam output signal can be obtained. The specific calculation method is as follows:

$$Coeff_i(k) = \frac{1}{N}\sum_{n=1}^{N} \|\tilde{S}_{Bi}(n)s^*(n)\|^2 \qquad (5)$$

$Coeff_i(k) = Coeff_i(k) + \alpha Coeff_i(k-1)$  (6)

$Coeff_i(k)$ represents a correlation coefficient reflecting the energy of the expected signal in an ith beam obtained by accumulating a kth correlation parameter, a is a factor for accumulating non-correlation parameter, which relates to the factors, such as moving speed of a mobile station in a cell, and it is normally taken $0 < \alpha < 1$. It can be seen from the equations (1) to (5) easily that a direction $\theta_{max}$ corresponding to the maximum coefficient $Coeff_{max}$ among $N_B$ correlation coefficient is a direction approximate that of the expected signal. Therefore, the array weight can be selected as $W = a^H(\theta_{max})$ for a digital beam output signal so as to obtain the maximum gain.

For the spatial domain matched filtering module 104 as shown in FIG. 3, the beams inputted by the multiplexer 402 are calculated by the multi-beam selection module 403 according to the equations (3) to (6) to obtain the correlation coefficients $Coeff_i(k)$. The correlation coefficients of the energy of expected signals in respective beams are obtained, from which a maximum correlation coefficient $Coeff_{max}$ is selected. A selection instruction is sent to the digital switching matrix 404, and the digital beam output signal corresponding to the maximum correlation coefficient is outputted by the digital switching matrix 404.

Figure 4:
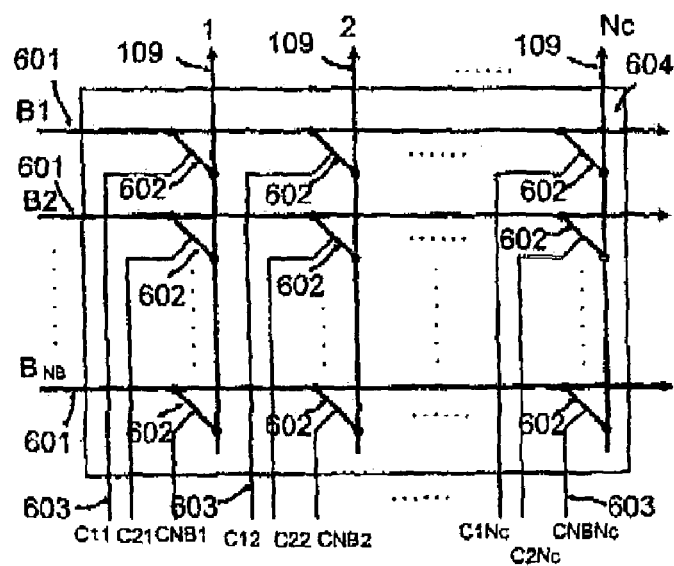
FIG. 4 is a principle diagram showing a digital switching matrix in accordance with the principles of the present invention.

Now refer to FIG. 4 for the digital switching matrix 404. As the implementation of the digital switching matrix 404 is known to those skilled in the art, the digital switching matrix 404 is explained simply herein.

The digital switching matrix 404 is mainly composed of an array of beam data lines 601, an array of output data lines 109, an array of digital switches 602, and an array of switch controlled signal lines 603. It can be seen from FIG. 4 that each of the beam data lines 601 is connected to one of the output data lines 109 corresponding to different channels via one of the digital switches 602. And the switching on and off of the digital switch 602 is controlled by one of the digital control signal lines 603 (based on the selection instruction) outputted by the multi-beam selection module 403 via the switch controlled signal line 603. The control signal can be expressed by a matrix:

$$C = \begin{bmatrix} C_{11} & C_{12} & \cdots & C_{1Nc} \\ C_{21} & C_{22} & \cdots & C_{2Nc} \\ \cdots & \cdots & \cdots & \cdots \\ C_{NB1} & C_{NB2} & \cdots & C_{NBNc} \end{bmatrix} \qquad (7)$$

It can be set that when element $C_{ij}$ in the matrix is 1, it indicates that the digital switch 602 is switched on, and the ith beam data line 601 is connected to the jth output data line 109; when $C_{ij}$ is 0, the ith beam data line 601 is disconnected with the jth output data line 109. In this way, the multi-beam selection module 403 controls the digital switching matrix 404 to easily select suitable beams for outputting to the prescribed output terminals.

Figure 5:
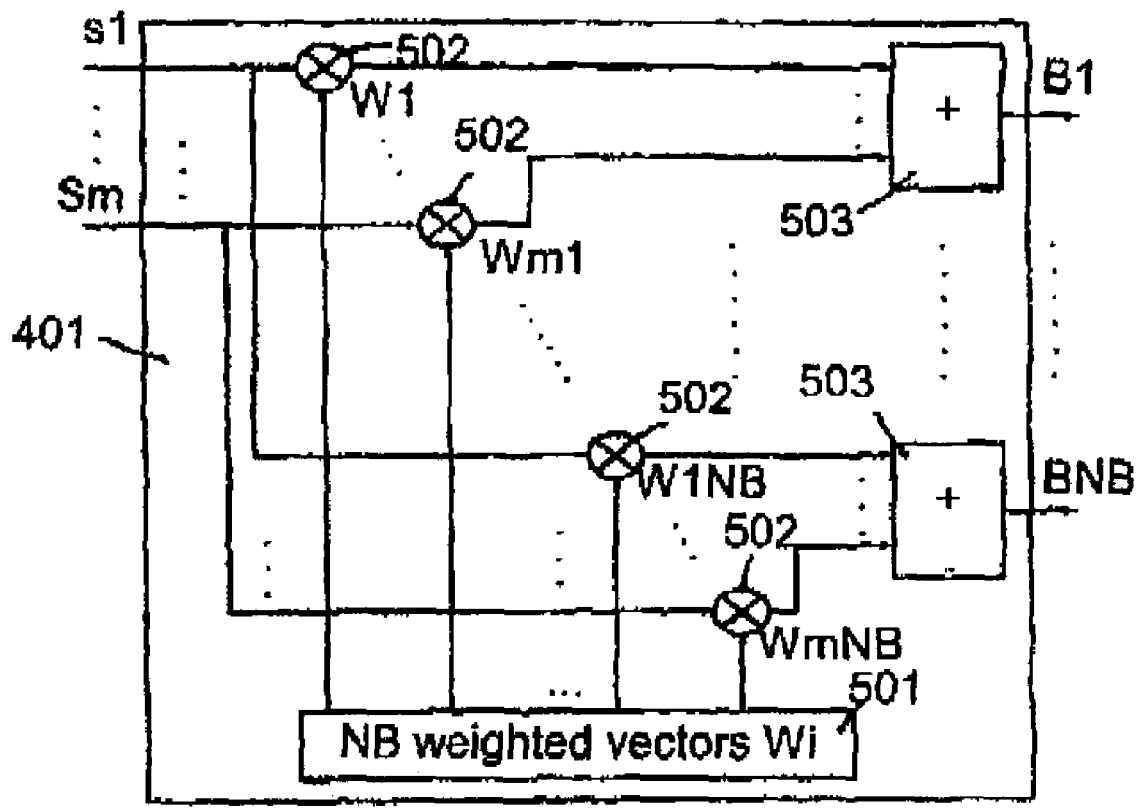
FIG. 5 is a basic principle diagram showing a digital baseband spatial domain matched filter set in accordance with the principles of the present invention.

The spatial domain matched filter set 401 is shown in FIG. 5 which is mainly composed of an array of multipliers 502 and an array of adders 503. The signals entering the spatial domain matched filter set 401 are multiplied by the multipliers 502 with weighted vectors $W_i$ 501, respectively. A signal combination is performed by the adders 503. The combined signals are the outputs of the digital beams. Because the spatial domain matched filter set 401 is mainly composed of the multipliers 502 and the adders 503, it can be implemented easily by an FPGA (Field Programmable Gate Array). It will be appreciated that the spatial domain matched filter set 401 can also be composed of other digital devices which are able to complete the multiplying and adding.

The construction structure and the operation principle of the array receiver in the invention have been described in detail herein above. Particularly, the construction and the operation principle of the digital baseband spatial domain matched filtering module 104, which is designed specially and uniquely by the invention, has been described. It can be seen from the above disclosure that a new spatial domain matched filtering method is used to implement the digital baseband spatial domain matched filtering module 104. In the method, in order to obtain the digital beams, the above equations (3), (4), (5) and (6) are used to obtain the correlation coefficient reflecting the expected signal energy in the respective beams. The digital beams are then selected and determined by the correlation coefficient. A flow chart of the spatial domain matched filtering method of the invention is shown in FIG. 6.

Figure 6:
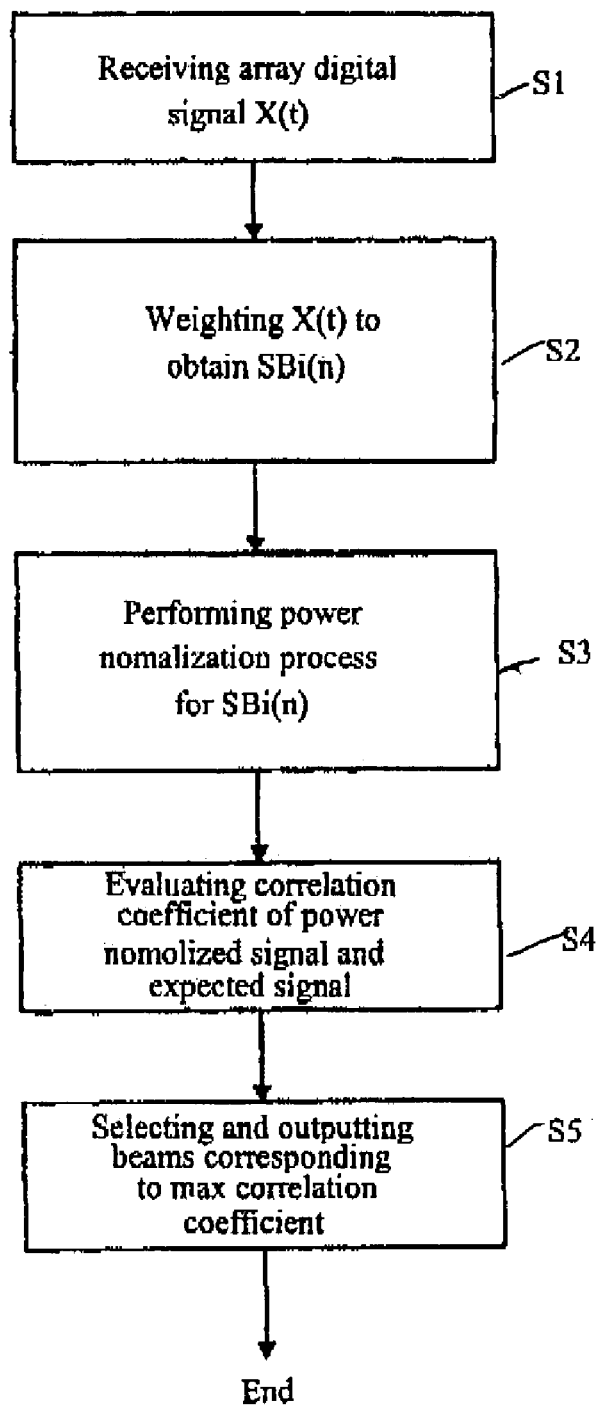
FIG. 6 is a flow chart showing a digital baseband spatial domain matched filtering method in accordance with the principles of the present invention.

As shown in FIG. 6, the array digital signal X(t) is received at step S1, that is, the array digital signal X(t) from the array digital signal generation module 103 is received by digital baseband spatial domain matched filtering module 104, corresponding to FIG. 1.

At step S2, the weighting calculation is performed for the array digital signals and $N_B$ sets of weighted vectors to obtain $N_B$ sets of the digital beam output signals $S_{B_i}(n)$. The step S2 corresponds to the functions performed by the spatial domain matched filter set 401 as shown in FIG. 3.

At step S3, based on the digital beam output signals $S_{B_i}(n)$, an average power value of each beam and the power normalized signal digital beam output $\tilde{S}_{B_i}(n)$ are evaluated according to the equations (3) and (4).

At step S4, the correlation coefficient $Coeff_i$ reflecting the expected signal energy in each beam is evaluated based on the equations (5) and (6).

In step S5, the obtained correlation coefficients $Coeff_i(k)$ reflecting the expected signal energy in the beams are compared and selected to obtain a maximum correlation coefficient $Coeff_{max}$, and the digital beam output signal $S_{B_i}(n)$ corresponding to the maximum correlation coefficient $Coeff_{max}$ is outputted.

In the embodiment corresponding to the method described herein, steps S3 and S4 are implemented by the multi-beam selection module 403 of the digital baseband spatial domain matched filtering module 104 shown in FIG. 3, and step S5 is implemented by the digital switching matrix 404 based on the selection instruction of the multi-beam selection module 403.

Figure 7:
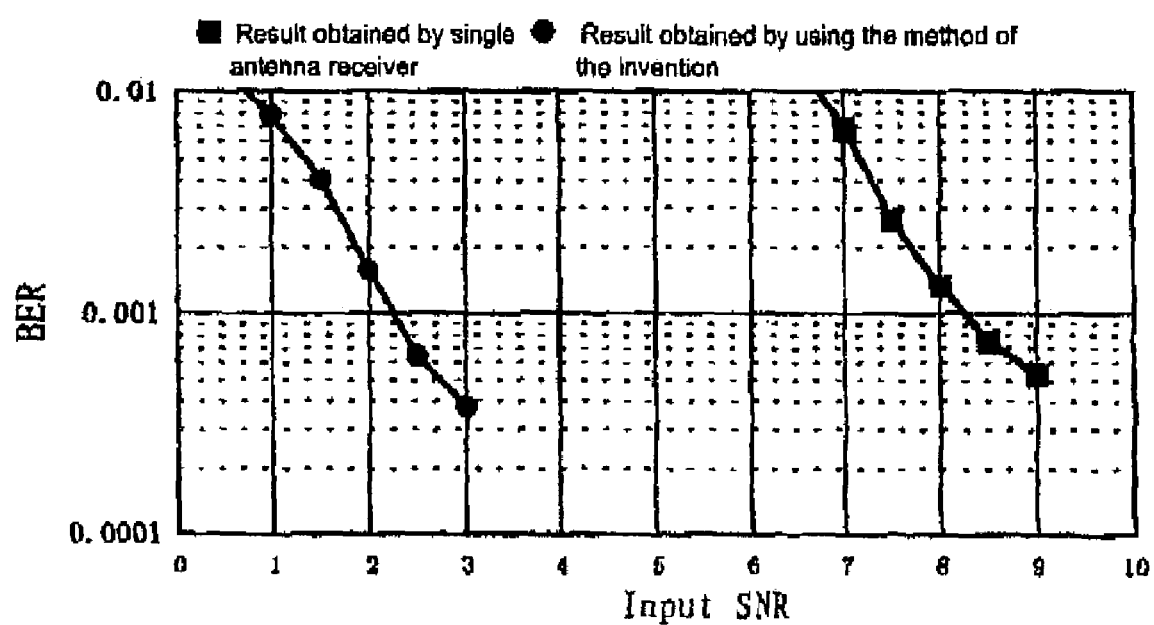
FIG. 7 is a simulation result in comparison of using a single antenna receiver and using an array receiver of the present invention in a CDMA system.

FIG. 7 illustrates simulation results of signals obtained by a single antenna receiver and results of signals obtained by using the method of the invention in an up-ling of a CDMA system. The parameters of a multipath in the simulation are as follows:

| Number of Multipaths | | | | 6 | | |
|---|---|---|---|---|---|---|
| Multipath Delay (second) | 0 | 3 10e-9 | 7 10e-9 | 1 090e-9 | 1 730e-9 | 2 510e-9 |
| Multipath Average Fading Factor (dB) | 0 dB | 1dB | 9dB | 10dB | 15dB | 20dB |
| Angular Spread (Degree) | | | | 5 | | |
| Number of Pilot Symbols | | | | 6 | | |
| Spread Factor | | | | 256 | | |
| Doppler Frequency | | | | 222 Hz | | |

It can be seen that for a four-element array receiver, when an input signal to noise ratio is about 2.2 dB, a bit error rate (BER) of the signal outputting by the digital receiver module of the present invention is about $10^{-3}$, whereas for a digital receiver module with a single antenna, to reach the BER of 10–3, the signal to noise ratio of the antenna input signal is about 8.2 dB. Thus, by using the method provided by the invention, the system performance is improved significantly.

What is claimed is:

1. A spatial domain matched filtering method, comprising the steps of:
   receiving array digital signals;
   performing a weighting calculation for the array digital signals and weighting vectors of $N_B$ set to obtain a digital beam output signal $S_{B_i}(n)$ of $N_B$ set;
   evaluating power value $P_{S_{B_i}}(n)$ of the digital beam output signal within a correlation time period:

$P_{S_{Bi}}(n)=\alpha_p S_{B_i}(n)S_{B_i}^*(n)+(1-\alpha_p)S_{B_i}(n-1)S_{B_i}^*(n-1)$ normalizing the beam output signal $S_{B_i}(n)$ to obtain a power normalized digital beam output signal $$\tilde{S}_{Bi}(n) = \frac{S_{Bi}(n)}{P_{S_{Bi}}(n)},$$

wherein, prefix "*" indicates a complex conjugation calculation, $\alpha_p$ is a constant, $0<\alpha_p<1$;
      correlating the power normalized digital beam output signal $\tilde{S}_{B_i}(n)$ with a reference signal and evaluating a correlation coefficient $Coeff_i$ reflecting energy of an expected signal in each beam, evaluating equation being:

$$Coeff_i(k) = \frac{1}{N}\sum_{n=1}^{N} \|\tilde{S}_{Bi}(n)s^*(n)\|^2$$

$Coeff_i(k)=Coeff_i(k)+\alpha Coeff_i(k-1)$
      wherein prefix "*" indicates a complex conjugation calculation, s(n) is the reference signal; N is a total amount of sample points, a product of N with sample time is smaller than coherent time; $Coeff_i(k)$ indicates correlation coefficient reflecting the energy of the expected signal energy in an ith beam, obtained by accumulating a kth correlation parameter; and $\alpha$ is a constant; and
   comparing obtained correlation coefficients $Coeff_i(k)$ reflecting the energy of the expected signal in the respective beams to obtain a maximum correlation coefficient $Coeff_{max}$, and outputting the digital beam output signal $S_{B_i}(n)$ corresponding to the maximum correlation coefficient $Coeff_{max}$.

2. The spatial domain matched filtering method as recited in claim 1, wherein $\alpha$ is in a range of $0.5<\alpha<1$.

3. An array receiver, comprising:
   an antenna array having a plurality of antennas;
   an array digital signal generating module coupled to the antenna array for converting analog signals received by the antenna array into digital signals;
   a digital baseband spatial domain matched filtering module coupled to the array digital signal generation module for forming at least one signal beam on each channel for the digital signals of the array digital signal generation module;
   a digital receiver module coupled to the digital baseband spatial domain matched filtering module for receiving at least one signal beam formed on each channel by the digital baseband spatial domain matched filtering module, and combining the digital signals over a time domain;
   wherein the digital baseband spatial domain matched filtering module comprises:
      a digital baseband spatial domain matched filter set for receiving the digital signals, weighting the digital signals with weighted vectors of $N_B$ set, and outputting digital beam output signals $S_{B_i}(n)$ of the $N_B$ set;
      a multiplexer for forming the digital beam output signals $S_{B_i}(n)$ of the $N_B$ set outputted by the digital baseband spatial domain matched filter set into digital beams corresponding to the respective channels;
      a multi-beam selection module for receiving the digital beams outputted by the multiplexer, normalizing the digital beam output signals $S_{B_i}(n)$, and evaluating power value $P_{S_{B_i}}(n)$ of the digital beam output signals within a correlation time period:

$P_{S_{Bi}}(n)=\alpha_p S_{B_i}(n)S_{B_i}^*(n)+(1-\alpha_p)S_{B_i}(n-1)S_{B_i}^*(n-1)$ normalizing the digital beam output signals $S_{B_i}(n)$ to obtain power normalized digital beam output signal $$\tilde{S}_{B_i}(n) = \frac{S_{Bi}(n)}{P_{S_{Bi}}(n)};$$

wherein, prefix "*" indicates a complex conjugation calculation, $\alpha_p$ is a constant, $0<\alpha_p<1$;
      correlating the power normalized digital beam output signals $\tilde{S}_{B_i}(n)$ with a reference signal and evaluating a correlation coefficient $Coeff_i$ reflecting energy of an expected signal in each beam and outputting a selection instruction to select one of the digital beam output signals $S_{B_i}(n)$ corresponding to a maximum correlation coefficient; an evaluation equation being:

$$Coeff_i(k) = \frac{1}{N}\sum_{n=1}^{N} \|\tilde{S}_{Bi}(n)s^*(n)\|^2$$

$Coeff_i(k)=Coeff_i(k)+\alpha Coeff_i(k-1)$
      wherein, prefix "*" indicates a complex conjugation calculation, s(n) is the reference signal; N is a total amount of sample points, a product of N with sample time is smaller than coherent time, $Coeff_i(k)$ indicates correlation coefficient reflecting the energy of the expected signal in an ith beam, obtained by accumulating a kth correlation parameter, and $\alpha$ is a constant;

a digital switching matrix coupled to the multiplexer and the multi-beam selection module, respectively, for receiving the selection instruction outputted by the multi-beam selection module and outputting the digital beam output signal corresponding to the maximum correlation coefficient.

4. The array receiver as recited in claim 3, wherein $\alpha$ is in a range of $0.5 < \alpha < 1$.

* * * * *